United States Patent [19]

Ohkubo

[11] Patent Number: 4,465,931

[45] Date of Patent: Aug. 14, 1984

[54] THERMAL DUPLICATING APPARATUS

[75] Inventor: Toshimi Ohkubo, Kawanishi, Japan

[73] Assignee: Ricoh Company, Ltd., Japan

[21] Appl. No.: 446,677

[22] Filed: Dec. 3, 1982

[30] Foreign Application Priority Data

Dec. 3, 1981 [JP] Japan .................. 56-195432

[51] Int. Cl.³ .............................................. G03C 5/16
[52] U.S. Cl. ................................... 250/317.1; 250/319;
250/318; 355/104; 355/106; 101/470; 101/471;
101/128.21; 101/128.4
[58] Field of Search .............. 250/316.1, 317.1, 318.1,
250/319.1; 355/104, 106; 101/470, 471, 128.21,
128.4

[56] References Cited

U.S. PATENT DOCUMENTS 3,501,635  3/1970  Sprunger et al. .................. 250/319
3,552,317  1/1971  Ritzerfeld ........................ 250/319 X
3,694,245  9/1972  Anderson et al. ............... 101/128.4

Primary Examiner—Alfred E. Smith
Assistant Examiner—Jack I. Berman
Attorney, Agent, or Firm—Guy W. Shoup

[57] ABSTRACT

A thermal duplicating apparatus for forming a duplicate image of an original image by selective application of heat to a heat sensitive recording medium is provided. The present apparatus utilizes a flexible cylinder which is substantially transparent to the irradiated light ray. The flexible cylinder in effect rolls along the heat sensitive recording medium overlying an original in a flat state as pressed thereagainst to effect duplicating operation progressively from one end to the opposite end.

12 Claims, 14 Drawing Figures

THERMAL DUPLICATING APPARATUS

BACKGROUND OF THE INVENTION

1. Field of the Invention

This invention relates to a thermal duplicating apparatus and in particular to such a thermal duplicating apparatus which produces a duplicate image on a heat sensitive recording medium with the use of a light ray such as infrared light.

2. Description of the Prior Art

As a thermal duplicating apparatus employing infrared light, an apparatus for producing stencils for use in mimeography is well-known. One example of such a stencil producing apparatus is shown in FIG. 1. As shown, the stencil producing apparatus includes a rotatably supported glass cylinder 1 and a pressure rubber roller 2 disposed in parallel with the cylinder 1. Inside of the cylinder 1 is disposed an infrared light lamp 3 extending in the axial direction of the cylinder 1. A mirror 4 is also disposed inside of the cylinder 1 such that the light emitting from the lamp 3 is collected in the vicinity of the nip line between the cylinder 1 and the roller 2. There is provided a guide member 5 for guiding the advancement of the laminate 6, which is a combination of a stencil and an original, after irradiation of infrared light.

In operation, the pressure roller 2 is driven to rotate in the direction indicated by the arrow 7 to rotate the cylinder 1 in the direction indicated by the arrow 8, and the lamp 3 is lit. Under the condition, the laminate 6 of a stencil and an original is inserted from left into the nip line between the cylinder 1 and the roller 2. As shown in FIG. 2a, the stencil includes a sheet 10 of paper to which is adhered a film 12 by an adhesive agent 11 containing a coloring agent with a separating agent 13 applied to the surface of the film 12. The stencil is brought into intimate contact with an original 14 such that the surface of the stencil having thereon a layer of separating agent 13 faces that side of the original 14 having thereon an original image 15. And then such a laminate is fed into the duplicating apparatus such that infrared light is irradiated to the laminate from its side where the sheet 10 of paper is exposed.

When irradiated by infrared light along the contact line between the cylinder 1 and the roller 2, there appears a difference in the amount of heat absorption between the image area 15 and background area of the original 14 in accordance with a difference in contrast therebetween. As a result, as shown in FIG. 2b, the separating agent 13 and the film 12 melt at those locations opposite to the image area 15 where the amount of heat absorption is large thereby holes 17 are formed and those portions of the coloring agent located in the periphery of the holes 17 become colored. In this manner, holes 17 are formed corresponding to the original image 15 in the surface of the stencil which is transported in the direction indicated by the arrow 9 as guided by the guide member 5. Thus there is obtained a stencil ready to be used in mimeography when the original 14 is peeled off.

However, in the prior art apparatus of FIG. 1, the glass cylinder 1 is relatively thick, ranging from 1.5 to 2 mm, so that the thermal efficiency of the infrared light lamp 3 tends to be lower. Moreover, since the roller 2 is provided as pressed thereagainst, the cylinder 1 could be broken.

SUMMARY OF THE INVENTION

In accordance with the present invention, use is made of a flexible cylinder which is rotatably supported and in which is disposed a light source such as an infrared light lamp. This flexible cylinder is rotated as pressed against a laminate including an original and a heat sensitive recording medium overlying the original. Since the cylinder is flexible, it slightly deforms when pressed against the laminate thereby allowing to obtain excellent duplicating condition. Preferably, use may be made of a plastic cylinder, ceramic cylinder or a net cylinder formed by weaving metal fine strands or glass fibers. Thus such a flexible cylinder must be transparent to light and it must be so provided as to impart a predetermined pressure to the heat sensitive recording medium. As the light source, an infrared light lamp including a halogen lamp is most preferred.

It is therefore a primary object of the present invention to provide an improved thermal duplicating apparatus.

Another object of the present invention is to provide a thermal duplicating apparatus for excellent thermal radiation efficiency.

A further object of the present invention is to provide a thermal duplicating apparatus capable of producing a duplicate of excellent quality.

A still further object of the present invention is to provide a thermal duplicating apparatus which is less susceptible to breakage and thus can offer an extended service life.

A still further object of the present invention is to provide a thermal duplicating apparatus which may be manufactured easily and thus inexpensively.

A still further object of the present invention is to provide a thermal duplicating apparatus capable of producing stencils for use in mimeography.

Other objects, advantages and novel features of the present invention will become apparent from the following detailed description of the invention when considered in conjunction with the accompanying drawings.

DESCRIPTION OF THE PREFERRED EMBODIMENTS

Figure 3:
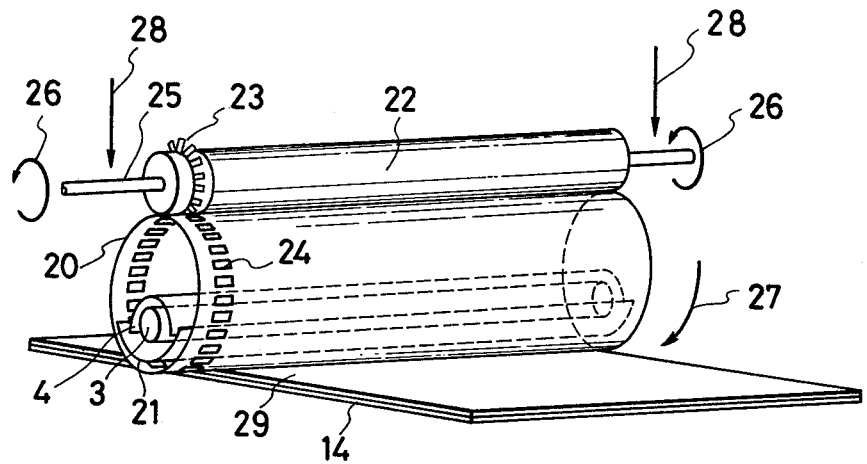
FIG. 3 is a schematic illustration in perspective showing the thermal duplicating apparatus constructed in accordance with one embodiment of the present invention.

Referring now to FIG. 3 showing one embodiment of the present invention, the thermal duplicating apparatus includes a flexible cylinder 20 which is formed by a transparent plastic material and which is supported to roll along a predetermined path. Inside of the cylinder 20 are disposed an infrared light lamp 3 extending in the longitudinal direction of the cylinder 20, a reflecting mirror 4 partly surrounding the lamp 3 to direct the light from the lamp 3 toward a heat sensitive recording medium in contact with the cylinder 20 and a shutter 21 for preventing the light from the lamp 3 from reaching the recording medium when located at the shielding location. The shutter 21 is operated exteriorly of the cylinder 20 to be located at the shielding location or at the retracted location in which case the light from the lamp 3 is permitted to reach the recording medium. Although not shown specifically, these elements 3, 4 and 21 are supported such that they move along the recording medium as the cylinder 20 rolls therealong.

On top of the cylinder 20 is provided a roller 22 extending in parallel with and in rolling contact with the cylinder 20. At one end of the roller 22 is provided a sprocket 23 which engages in the perforations 24 provided at one end of the cylinder 20. A pair of driving shafts 25 are fixedly connected to the roller 22, and the driving shafts 25 are operatively coupled to a driving source (not shown) to be driven to rotate in the direction indicated by the arrow 26, so that the cylinder 20 rotates in the direction indicated by the arrow 27. The roller 22 also imparts a pressing force to the cylinder in the direction indicated by the arrow 28. As shown the cylinder 20 rolls on a heat sensitive recording medium 29 which is placed on and in intimate contact with an original 14.

The cylinder 20 may be formed by a plastic material as long as it is substantially transparent and heat-resistive. Polycarbonate having the deformation temperature of approximately 130° C. may be preferably used. The cylinder 20 preferably has the inner diameter of at least approximately 50 mm because it is often intended to accomodate therein the lamp 3, mirror 4 and shutter 21, and the cylinder 20 is preferably 0.5 mm thick because it must withstand the pressing force applied thereto by the roller 22. The length of the cylinder 20 may be determined appropriately by taking into account the size of the recording medium 29. The pressing force applied to the cylinder 20 must be such that the recording medium or paper 29 is brought into close contact with the original 14, and thus it varies depending on the condition of the original 14; however, it is preferably set approximately at 3 Kg or more.

The heat sensitive recording medium 29 may be structured such that it includes a base sheet such as a sheet of paper on which is formed a coloring layer comprised of a coloring material and a binder. Such a base sheet must have a good light transmitting efficiency for light such as infrared light to be used in the duplicating operation and it must also have a good heat resistance characteristic. When the recording medium 29 is placed on the original 14, it may be so placed that the coloring layer faces the original 14, or alternatively the coloring layer is located on the opposite side of the original 14. When the recording medium 29 is placed with its coloring layer facing the original 14, the duplicated image formed on the recording medium 29 is a mirror image of the original image, so that such a duplicated image must be read through the base sheet by the observer, which additionally requires that the base sheet be transparent or at least semi-transparent to visible light. For this reason, use may be preferably made of a sheet of vinyl plastic or the like.

On the other hand, when the recording medium 29 is placed on the original 14 with its coloring layer located on the opposite side of the original 14, a duplicated image is a normal image, and thus the base sheet is not required to be transparent or semi-transparent to visible light. However, since the coloring layer must receive enough heat as conducted through the sheet to form a duplicate image, the sheet must have a good heat conductive characteristic as well as the above-mentioned light transmitting and heat resistive characteristics. Furthermore, the thickness of the base sheet is also important in this case, and the thicker the base sheet, the unclearer a duplicate image. Thus, approximately 30 grm/m$^2$ is preferred.

It is to be noted that the previously mentioned material for forming an original to be used in mimeography may be used as the heat sensitive recording medium 29.

In operation, there are three ways to initiate the duplicating operation of the recording apparatus shown in FIG. 3. In the first method, the cylinder 20 is first driven to rotate, and then the lamp 3 is lit, followed by the step of moving the shutter 21 to the retracted position. The advantages of this method includes prevention of light from the lamp 3 from accidentally getting into the eyes of the operator. In accordance with the second method, the cylinder 20 is first driven to rotate and then the shutter 21 is moved to the retracted postion, and thereafter the lamp 3 is illuminated. Alternatively, as the third method, when the cylinder 20 comes to a halt, the lamp 3 is kept lit with the shutter 21 located at the shielding location, and when the cylinder is again driven to rotate, the shutter 21 is moved to the retracted position.

Figure 4:
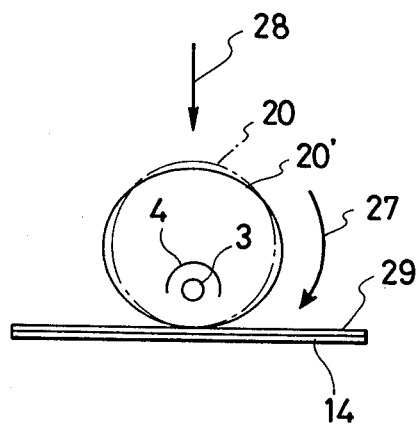
FIG. 4 is a schematic illustration showing the condition while the cylinder 20 rolls along the recording medium 29 as pressed thereagainst in the apparatus of FIG. 3.

When the duplicating operation is initiated by any one of the above-described methods, the cylinder 20 starts to roll along and as pressed against the recording medium 29 overlying the original 14 with the lamp 3 emitting light and the shutter 21 kept at the retracted position. Under the condition, the cylinder 20 receives the pressing force to be deformed to take the elliptic shape as indicated by the solid line 20' in FIG. 4 because of its elasticity. Thus the recording medium 29 is locally brought into intimate contact with the original 14 as the cylinder 20 rolls on the recording medium 29 thereby the contact line between the cylinder 20 and the recording medium 29 and its vicinity is irradiated by the light emitted from the lamp 3. Since it is so structured that the cylinder 20 rolls on the recording medium 29, the duplicating operation may be carried out progressively from one end of the recording medium 29 to its the other end. Moreover, such a structure is advantageous because the cylinder 20 is prevented from being excessively heated locally and the recording medium 29 may be maintained at a relatively low temperature since the cylinder 20 carries some heat away as it rolls.

Upon completion of the duplicating operation, the shutter 21 is closed or moved to the shielding location and then the lamp 3 is extinguished, or the sequence of these steps may be reversed, if desired, and finally the cylinder 20 is brought to a halt. Importantly, at the initiation of or at the end of the duplicating operation, the condition of the shutter 21 open and the lamp 3 on must be avoided by all means when the cylinder 20 is not in motion. As briefly pointed out before, if such a condition exists, the cylinder 20 becomes excessively heated locally and it could be deformed permanently. Accordingly, in the case where the shutter 21 is not provided, it must be so structured that the lamp 3 is extinguished whenever the cylinder 20 is set motionless.

Figure 5:
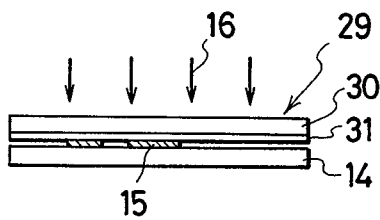
FIGS. 5a through 5c are schematic illustrations showing a series of steps for forming a duplicate image on the heat sensitive medium by using the apparatus of FIG. 3.
Figure 5:
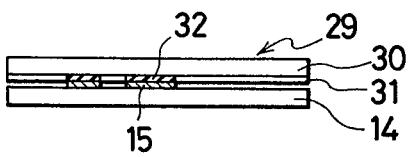
Figure 5:
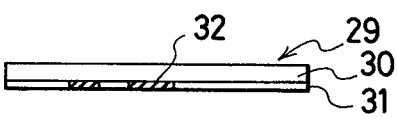

Referring now to FIGS. 5a-5c and 6a-6c, the principle of the duplicating operation in accordance with the present invention will be described. FIGS. 5a-5c show the steps when the recording medium 29 is placed on the original 14 with its coloring layer facing the medium 29. As shown in FIG. 5a, infrared light 16 is irradiated through the base sheet 30 of the recording medium 29 brought into intimate contact with the original 14. When the infrared light reaches the original 14, it is absorbed predominantly at the image area 15, and thus that portion of the coloring layer 31 of the recording medium 29 which is in close contact with the image area 15 becomes colored; on the other hand, that portion of the coloring layer 31 which is in contact with the background area of the original stays colorless since the absorption of the infrared light at this portion is substantially low, as shown in FIG. 5b. Thereafter, when the recording medium 29 is separated from the original 14, there is produced a duplicated image 32 which is a mirror or reversed image of the original image 15.

Figure 6:
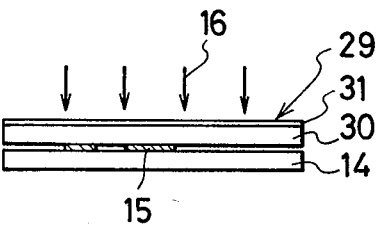
FIGS. 6a through 6c are schematic illustrations showing another series of steps for forming a duplicate image on the heat sensitive medium by using the apparatus of FIG. 3.
Figure 6:
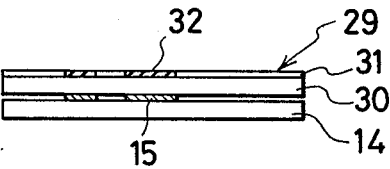
Figure 6:
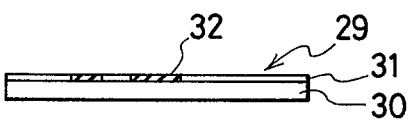

FIGS. 6a-6c show the duplicating process when the recording medium 29 is placed on the original 14 such that the coloring layer 31 of the recording medium 29 is positioned at the opposite side of the original 14. As shown in FIG. 6a, when infrared light 16 is irradiated, the image area 15 of the original 14 significantly absorbs the irradiated light to produce heat which is transferred to the coloring layer 31 through the base sheet 30 thereby that portion of the coloring layer 31 which corresponds to the original image 15 produces color, as shown in FIG. 6b. On the other hand, that portion of the coloring layer 30 which corresponds to the background area of the original 14 stays colorless because the absorption of infrared light in this area is rather at low level. Accordingly, there results a duplicate image 32 which is a normal copy of the original image 15, as shown in FIG. 6c.

Figure 7:
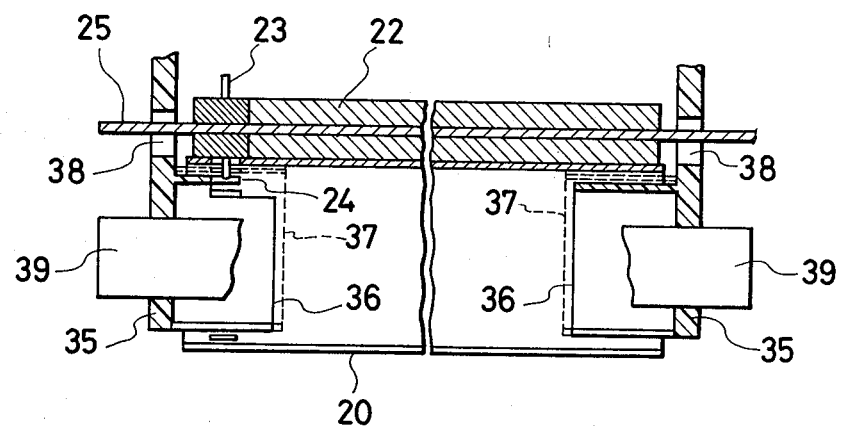
FIG. 7 is a schematic illustration showing one example of the support structure for supporting the cylinder of FIG. 3.

FIG. 7 illustrates one example for supporting the cylinder 20 to roll along the recording medium 29. As shown, on both ends of the cylinder 20 are provided support arms 35,35; however, the bottom ends of the support arms 35,35 are located above the lowest point of the cylinder which is in contact with the recording medium 29. Each of the support arms 35 is provided with a partly cut-away inner support cylinder 36 which is smaller in diameter than the cylinder 20 and a partly cut-away outer support cylinder 37 which is larger in diameter than the cylinder 20. A sufficient gap is provided between the inner and outer support cylinders 36 and 37 so as to allow proper deformation of the cylinder 20 when pressed by the roller 22. Thus, the cylinder 20 is supported to roll along the recording medium 29 since the both end portions of the cylinder 20 are inserted into the gaps between the inner and outer support cylinders 36 and 37. It is to be noted that the inner and outer support cylinders 36 and 37 are partly cut away such that those portions of these support cylinders 36 and 37 which are located below the bottom ends of the support arms 35, 35 are removed. It should also be noted that the inner and outer support cylinders 36 and 37 provided at the left-hand support arm 35 are further cut away in part at their top portions so as not to interfere with the engagement between the sprocket 23 of the roller 22 and the perforations 24 of the cylinder 20.

The driving shafts 25 of the roller 22 extend through holes 38, 38 provided in the support arms 35, 35, respectively, and they are connected to a rotary driving source (not shown) such as a motor and also to a mechanism for applying a pressure force to the cylinder 20. It is to be noted that the holes 38, 38 are made sufficiently large so as to allow the driving shafts 25, 25 to move up and down to some extent. Also provided are holding members 39, 39, which are fixedly mounted on the respective support arms 35, 35, for holding the lamp 3, mirror 4 and shutter 21 within the cylinder 20 irrespective of the rotational and translational motion of the cylinder 20.

With supporting the cylinder 20 as shown in FIG. 7, when the driving shafts 25 are driven to rotate and also pressed downward, the cylinder 20 is forced to rotate through engagement between the sprocket 23 and the perforations 24 to roll along the recording medium 29, and at the same time the roller 22 imparts a pressing force to the cylinder uniformly along the longitudinal axis so that the cylinder 20 is kept in pressure contact with the recording medium 29 while the cylinder 20 rolls along the recording medium 29. On the other hand, the lamp 3, mirror 4 and shutter 21 are moved in parallel with the surface of the recording medium 29 as kept inside the cylinder 20 even if it traverses along the recording medium 29. It is preferable to form the roller 22 by a material having a good heat conductive characteristic, e.g., aluminum, because the roller 22 may function as a heat sink thereby allowing to keep the cylinder 20 at low temperature.

As one example of the above embodiment, the cylinder 20 was formed by polycarbonate to have the inner diameter of 55 mm and the thickness of 0.5 mm. Using this cylinder, the duplicating operation was carried out with the application of pressing force of 5 Kg whereby the cylinder 20 was deformed by 10% and a satisfactory duplicate image was obtained.

Figure 1:
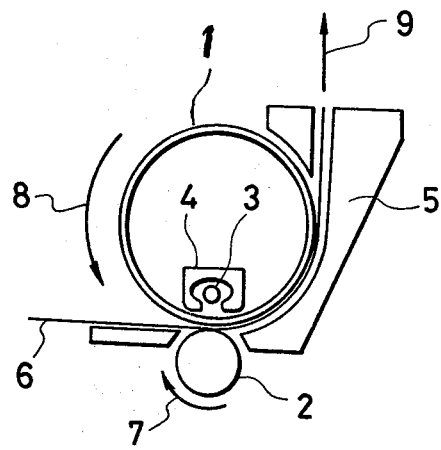
FIG. 1 is a schematic illustration showing the typical prior art thermal duplicating apparatus.
Figure 2A:
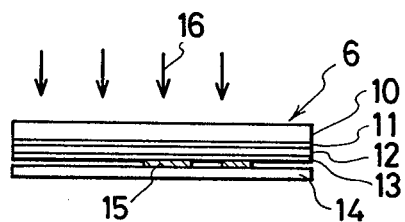
FIG. 2a is a schematic illustration showing the condition that the to-be-formed stencil is placed on the original 14 and the infrared light 16 is irradiated.
Figure 2B:
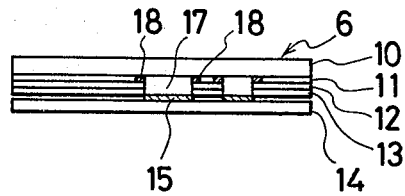
FIG. 2b is a schematic illustration showing the condition that the stencil is formed after irradiation of infrared light.

It is to be noted that the sprocket 23 may be provided on both sides of the roller 22, if desired. In this case, the cylinder 20 may be driven to rotate more securely as well as uniformly. it is to be further noted that in the above-described embodiment of the present invention, the cylinder 20 is so structured to roll along and press against the heat sensitive recording medium to bring the medium in close contact with the original as different from the prior art technique of FIG. 1 in which a laminate of the recording medium and the original is passed through the nip line between the cylinder 1 and the pressing roller 2. Thus the present invention allows to use even a thick original and for that matter there is no limitation for the thickness of an original to be used in the present invention. In the above-described embodiment of the present invention, it is so structured that the laminate of the recording medium 29 and the original 14 is positioned stationarily and the cylinder 29 rolls along the recording medium 29. However, it may also be so structured that the cylinder 20 is only driven to rotate without attendant translational motion and a laminate of the recording medium 29 and the original 14 is placed on a carriage which is moved in a predetermined direction in association with the rotation of the cylinder 20.

Figure 8:
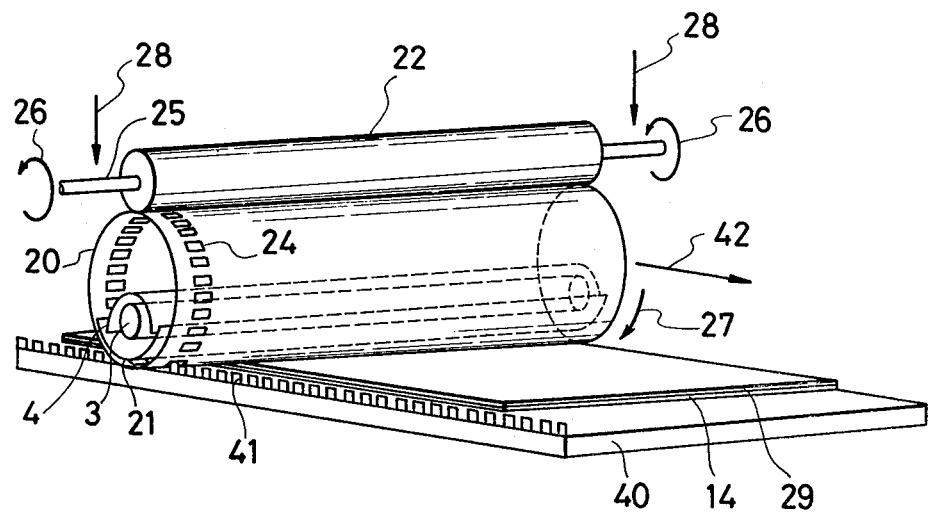
FIG. 8 is a schematic illustration in perspective showing the thermal duplicating apparatus constructed in accordance with another embodiment of the present invention.

FIG. 8 shows another embodiment of the present invention in which provision is made of a carriage 40 which carries thereon the original 14 on which is placed the heat sensitive recording medium 29. Along one side of the carriage 40 is provided with a rack 41 which is engageable with the perforations 24 of the cylinder 20. In operation, when a force is applied to the cylinder 20 in the direction indicated by the arrow 42, the cylinder 20 is caused to rotate in the direction indicated by the arrow 27 due to engagement between the rack 41 and the perforations 24 so that the cylinder 20 in effect rolls along the recording medium 29. It should be noted that in the present embodiment the driving shaft 25 needs not be driven to rotate and it is only required to impart the pressing force 28 to the cylinder 20 as described previously.

As a modification of the structure shown in FIG. 8, the cylinder 20 may be so provided as to be rotatable at a fixed position and the carriage 40 is driven to execute a translational motion with respect to the cylinder 20 thereby causing the cylinder 20 to rotate. It is to be noted that the support structure shown in FIG. 7 may also be applied to the embodiment of FIG. 8.

It should further be noted that it is preferable to provide means for preventing slippage between the cylinder 20 and the recording medium 29. For this purpose, the outer surface of the cylinder 20 may be so structured to have an increased friction, for example, by providing an irregularity on the outer surface of the cylinder along its axial direction.

Figure 9:
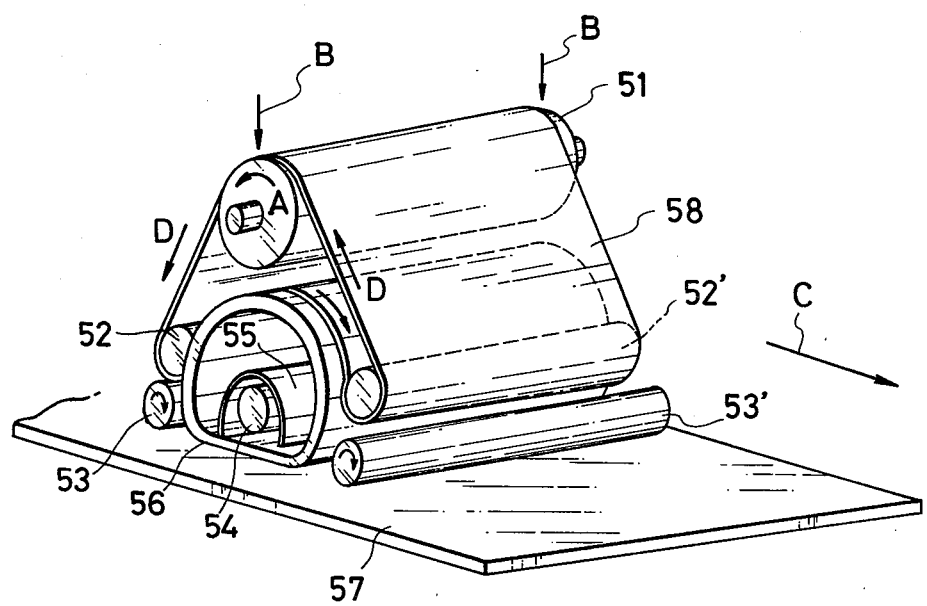
FIG. 9 is a schematic illustration in perspective showing the thermal duplicating apparatus constructed in accordance with a further embodiment of the present invention.

FIG. 9 shows a further embodiment of the present invention in which an endless belt is provided as a means for transmitting a driving force to the cylinder which rolls along a recording medium. As shown, a driving roller 51 is provided as connected to a driving source such as a motor (not shown) and a pair of upper guide rollers 52, 52' is also provided. An endless belt 58 is provided as extended around the driving roller 51 and the pair of rollers 52 and 52'. A duplicating cylinder 56 of an elastic material is provided as pressed against a laminate 57 including a heat sensitive recording medium overlying an original by contact with a portion of the belt 58. Inside of the flexible cylinder 56 are disposed an infrared light lamp 54 and a reflecting mirror 55 for directing the light emitted from the lamp 54 to the contact area between the cylinder and the recording medium. It is to be noted that a shutter for controlling the irradiation of light to the laminate 57 may also be disposed inside of the cylinder 56. Also provided is another pair of lower guide rollers 53, 53'. Although not shown specifically, it should be understood that all of these elements are rotatably supported by a single frame at both ends.

The driving roller 51 is driven to rotate by an external driving source in the direction indicated by the arrow A and thus the belt 58 is caused to advance in the direction indicated by the arrows D. The driving roller 51 together with the pair of rollers 52 and 52' receive the downward pressing force indicated by the direction through the frame which supports these rollers rotatably. As a result, the duplicating cylinder 56 of an elastic material is positioned between the upper guide rollers 52 and 52' and it is pressed against the laminate 57 by that portion of the belt 58 extending between the pair of rollers 52 and 52'. When the downward pressing force B is applied, the lower guide rollers 53 and 53' come into rolling contact with the laminate 57 thereby the relative distance between the lamp 54 (and the mirror 55) and the laminate 57 is automatically adjusted to a predetermined value. Moreover, the upper portion of the cylinder 56 maintains its circular shape since it is in contact with the belt 58; whereas, the lower portion of the cylinder 56 is somewhat deformed to establish a surface contact with the laminate 57 including a heat sensitive recording medium overlying an original, so that the recording medium becomes locally brought into intimate contact with the underlying original.

Under the circumstances, since the belt 58 is driven to advance in the direction indicated by the arrow D, the cylinder 56 is caused to roll in the direction indicated by the arrow C along the laminate 57 as pressed thereagainst. At the same time, the laminate 57 is progressively irradiated by the infrared light from one end to the other, so that the recording medium is selectively heated in accordance with the original image to produce thereon a duplicate image.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A thermal duplicating apparatus for forming a duplicate of an original by selective application of heat comprising:

a flexible cylinder having a predetermined inner diameter and thickness;

support means for supporting said flexible cylinder rotatably;

a light source supported by said support means to be disposed inside of said flexible cylinder, said light source emitting a light ray to which said flexible cylinder is substantially transparent pressing means for pressing said flexible cylinder against the surface of a heat sensitive recording medium overlying the original held substantially in a flat state whereby said flexible cylinder is slightly deformed; and means for causing a relative motion between said support means and said recording medium overlying the original whereby said flexible cylinder in effect rolls along the surface of said recording medium to bring said recording medium progressively in close contact with the original from one end to the opposite end so that said recording medium receives heat in accordance with the image pattern of said original to form a duplicate image thereon.

2. Apparatus of claim 1 further comprising a reflecting mirror supported by said support means to be disposed inside of said flexible cylinder thereby partly surrounding said lamp so that the light emitted from said lamp is directed to the contact area between said flexible cylinder and said recording medium.

3. Apparatus of claim 2 further comprising a shutter movably supported by said support means to be disposed inside of said flexible cylinder, said shutter being selectively movable either to a shielding position where the light ray from said lamp is prevented from reaching the contact area between said flexible cylinder and said recording medium or to a retracted position where the light ray from said lamp is allowed to reach the contact area.

4. Apparatus of claim 1 wherein said pressing means includes a pressure roller extending in parallel with and in rolling contact with said flexible cylinder.

5. Apparatus of claim 4 wherein said means for causing includes a sprocket provided integrally with said pressure roller, said sprocket being engageable with the perforations provided at one end of said flexible cylinder, whereby said pressure roller is driven to rotate to cause said flexible cylinder to rotate so that said flexible cylinder rolls along the recording medium.

6. Apparatus of claim 4 further comprising a carriage for placing thereon said original on which is placed said heat sensitive recording medium substantially in a flat state, said carriage being provided with a rack along one side thereof which is engageable with the perforations provided at one end of said flexible cylinder.

7. Apparatus of claim 5 or 6 wherein said support means includes a pair of support arms spaced apart from each other and extending downwardly, each of the opposite surfaces of said support arms being provided with a partly cut-away inner support cylinder and a partly cut-away outer inner support cylinder, defining a gap therebetween, each end of said flexible cylinder being loosely fitted into said corresponding gap to be supported rotatably.

8. Apparatus of claim 1 wherein said light ray emitted from said lamp is an infrared light ray.

9. Apparatus of claim 1 wherein said flexible cylinder is comprised of a plastic material.

10. Apparatus of claim 9 wherein said plastic material is polycarbonate.

11. Apparatus of claim 1 wherein said flexible cylinder has a inner diameter of at least approximately 50 mm and the thickness of approximately 0.5 mm.

12. Apparatus of claim 1 wherein said pressing means includes a driving roller, an appropriate number of guide rollers, all of these rollers rotatably supported by said support means, and an endless belt extended around said driving and guide rollers with a part of said belt in contact with said flexible cylinder.

* * * * *